Sept. 12, 1950
G. B. SAYRE
2,522,134
AUTOMATIC CONTROL FOR INVERTED
TRANSFER MOLDING PRESSES
Filed May 14, 1947
3 Sheets-Sheet 1
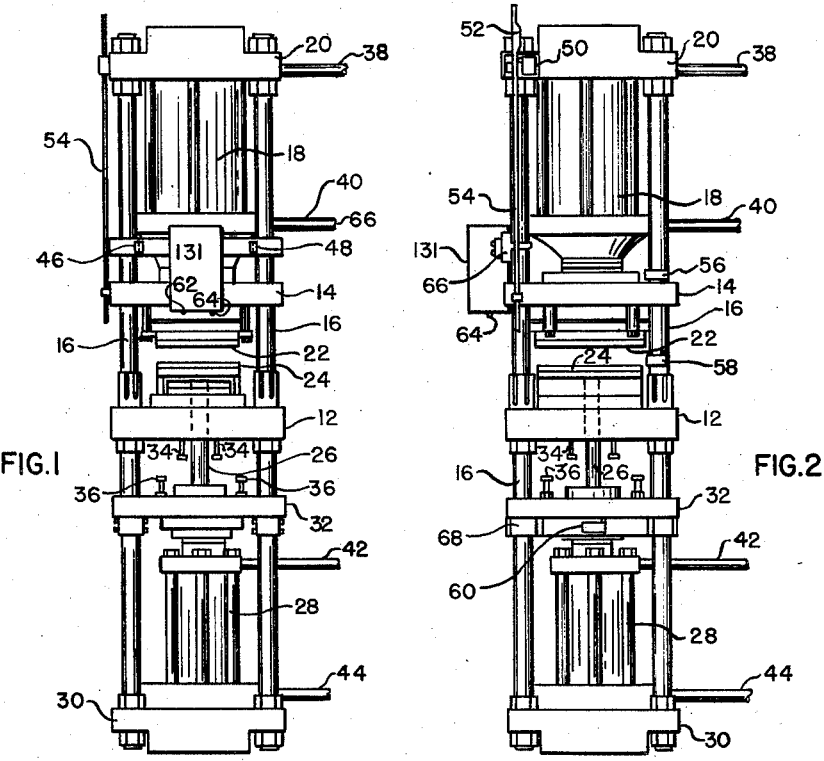
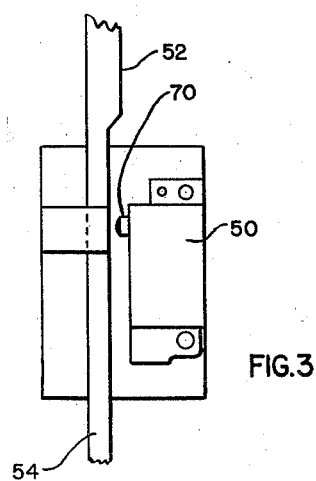
INVENTOR
GORDON B. SAYRE
BY James and Franklin
ATTORNEY

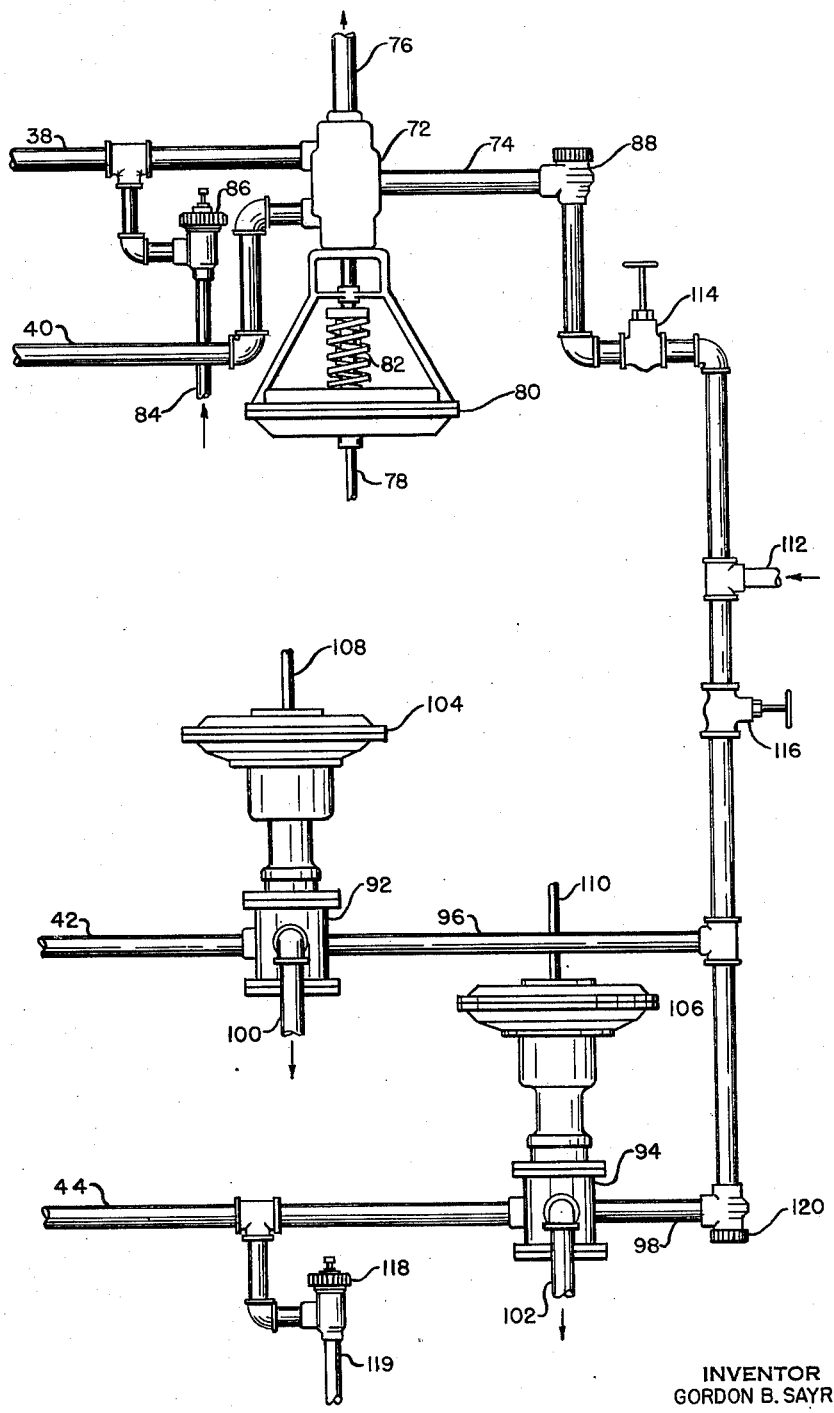

Sept. 12, 1950    G. B. SAYRE    2,522,134
AUTOMATIC CONTROL FOR INVERTED
TRANSFER MOLDING PRESSES Filed May 14, 1947                       3 Sheets-Sheet 3

INVENTOR
GORDON B. SAYRE

BY
ATTORNEY

Patented Sept. 12, 1950

2,522,134

UNITED STATES PATENT OFFICE 2,522,134

AUTOMATIC CONTROL FOR INVERTED TRANSFER MOLDING PRESSES

Gordon B. Sayre, Boonton, N. J., assignor to Boonton Molding Company, Boonton, N. J., a corporation of New Jersey Application May 14, 1947, Serial No. 748,066

22 Claims. (Cl. 18—30)

This invention relates to molding presses, especially inverted or upward-transfer molding presses for molding thermosetting resins, and more particularly to automatic control of the same.

The usual transfer molding press is arranged with the main or clamp cylinder at the bottom, and the transfer cylinder at the top. The present invention, however, is applied to a transfer molding press having the main or clamp cylinder at the top, and the transfer cylinder at the bottom. In other words, the press is inverted. Such a press is described and claimed in my copending application, Serial No. 748,065, filed on even date herewith.

Some advantages of the inverted press are that the molding material or pill may be dropped downwardly into a transfer pot which is open at the top whenever the mold is open; that the transfer pot is at a comparatively low height convenient for the operator; that the transfer pot is always closed at the bottom by the upper end of the transfer plunger, even when the mold is open; that the necessary length of stroke for the transfer plunger is minimized to that needed for the transfer operation alone; that the transfer plunger may itself be used as an ejection or knock-out means for separating the residue or pot cull from the die, at the same time that the molded pieces are separated from the die; and that the ejector half of the die may be made the lower half, so that the ejected product may be removed without a gravitational drop from the upper half to the lower half of the die, with consequent chance of breakage.

An inverted transfer press of the type described may be controlled manually. To facilitate control of the numerous valves required, certain simplified and partly automatic valves have been developed. However, even with such valves the control is essentially manual, in the sense that an operator must initiate the operation of the valves, and must observe a time clock to time the curing of the molded piece.

Automatic control systems have been made for other types of press, but so far as I am aware, these have all been of the program cycle shaft type, that is, they usually have a main cycle shaft which is slowly rotated under motor drive at a predetermined speed, the said shaft turning one complete revolution for one molding cycle. The shaft is provided with cams to suitably control the valves of the press. The program for an inverted press is more complex than usual, because the clamp piston must work positively in both directions, since the mold opens upwardly against gravity (instead of downwardly with the aid of gravity), and because the transfer piston operates in stages, the main transfer stroke and curing of the molded piece being followed by opening of the die, which in turn is followed by an additional ejection movement of the transfer plunger. Thereafter the transfer plunger is lowered to permit loading of a fresh supply of molding material into the transfer pot before the die is again closed.

The primary object of the present invention is to provide fully automatic control for an inverted transfer molding press, without necessitating the use of a conventional program cycle shaft. The resulting system is far simpler and less expensive than the program cycle shaft type, and may be made for only a fraction of the cost.

Ancillary objects are to provide for certain contingencies, such as opening of the press at any time; permitting the press to remain closed for heating the mold and transfer plunger before beginning work, or during the lunch hour; and accurately controlling the press during repair or mold adjustment, as when taking out one mold and replacing it with another. Another object is to provide for safety of the operator.

To accomplish the foregoing general objects, and other more specific objects which will hereinafter appear, my invention resides in the automatic press control elements, and their relation one to the other, as are hereinafter more particularly described in the following specification. The specification is accompanied by drawings, in which:

Fig. 1 is a front elevation of an inverted transfer molding press to which the invention has been applied;

Fig. 2 is a side elevation of the same;

Fig. 3 is an enlarged view of a cam-operated switch used on the press of Figs. 1 and 2;

Fig. 4 is a schematic diagram of the valve arrangement used with the present invention.

Figure 5:
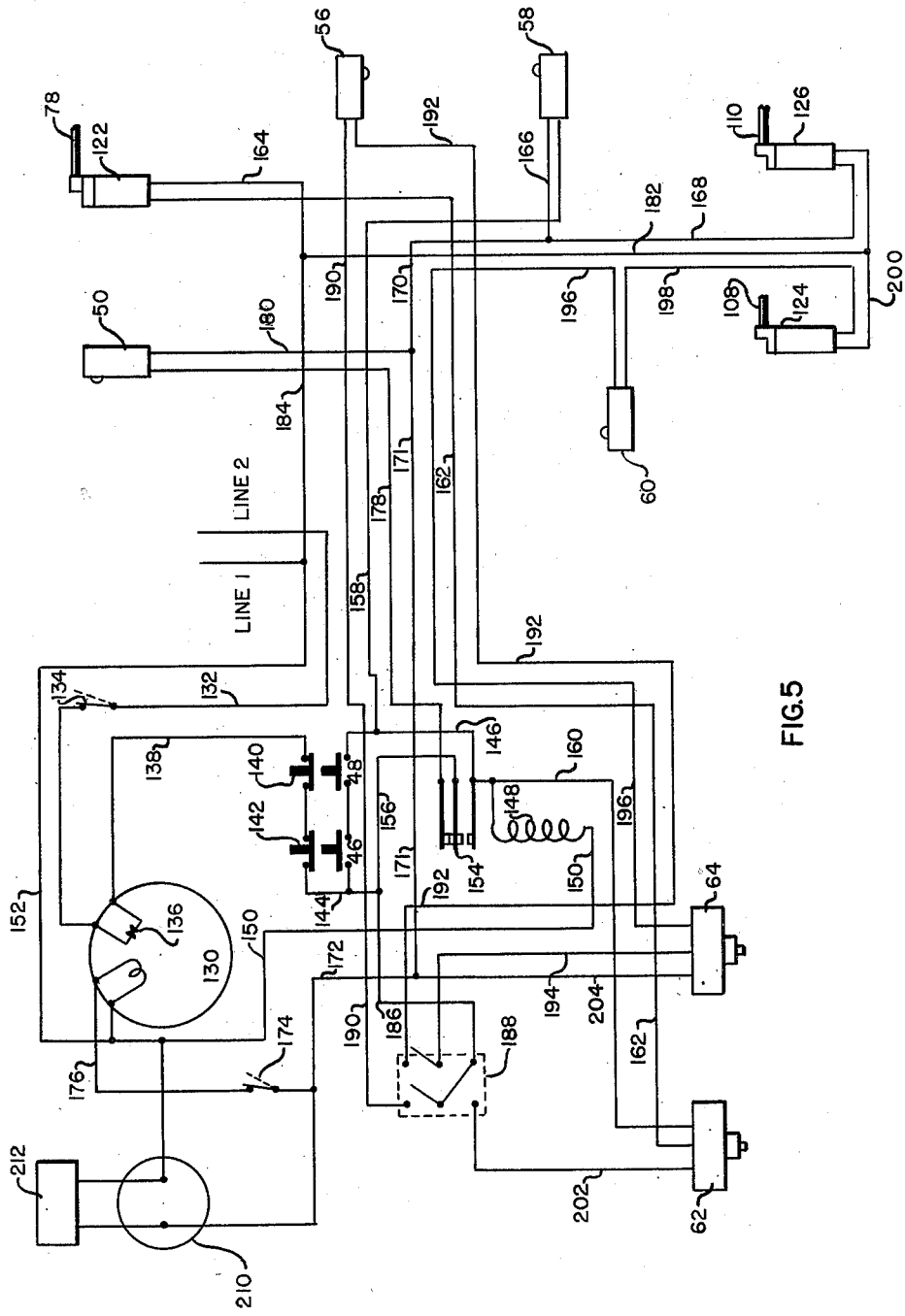
Fig. 5 is a wiring diagram for the electrical part of the apparatus.

Referring to the drawings, and more particularly to Figs. 1 and 2, the invention is here shown applied to an inverted transfer molding press, comprising a stationary head 12, and a movable head 14, slidable on tie rods 16. The movable head 14 is moved by means of a piston in a main or clamp cylinder 18, carried on a stationary head 20 secured to the upper ends of the tie rods 16. The upper half 22 of the die is mounted on the movable head 14. The lower half 24 of the die is mounted on the stationary head 12.

The transfer plunger 26 is located at the bottom of the press, and is operated by a piston in a transfer cylinder 28, the latter being carried by a stationary head 30 at the bottom of the press secured to the lower ends of the tie rods 16. A movable platen 32 is preferably disposed between the cylinder 28 and the transfer plunger 26, the platen 32 being slidable on the tie rods 16, and acting as a cross-head or guide.

The last part of the upward movement of platen 32 may be used for ejection purposes. At such time the platen bears against push studs 34, which in turn bear against an ejector plate in the ejector die 24. Moreover, the transfer plunger 26 itself acts as an ejection means for the pot cull or residue. The upward stroke is limited by adjustable stops 36, which in the present case are shown mounted on platen 32, and are intended to bear against the stationary head 12.

The clamp cylinder 18 must be double-acting in order to move the upper half of the mold positively in either direction, and for this reason pipes 38 and 40 are shown in Fig. 2 leading to both the upper and lower ends of the clamp cylinder 18. Similarly the transfer cylinder 28 must be double-acting, and pipes 42 and 44 lead to the upper and lower ends respectively of the transfer cylinder.

To start the press the operator must simultaneously press widely spaced starting button 46 and 48 (Fig. 1) with his left and right hands respectively. This is a safety feature, which ensures that the hands of the operator will be removed from the mold before the press is started. The transfer operation should not begin until the mold is closed, and to ensure closing of the mold a "Mold Closed" switch 58 (Fig. 2) is provided, the said switch being operated when the movable platen 14 has moved all the way down. This starts the transfer operation, and also starts a timing clock housed in box 131. (The clock is shown at 130 in Fig. 5.) When the curing time for which the clock is set has run out, pressure on the transfer plunger is relieved, and both ends of the transfer cylinder 28 are connected to waste, so that the plunger remains stationary. At the same time, the clamp cylinder 18 is operated to open the mold.

When the mold is closed, the cam 52 is below the ejection switch 50. When the mold has opened part way, the cam 52 changes the position of the ejection switch 50, and this causes the upward movement of the transfer plunger to be resumed. This produces ejection of the molded pieces through the operation of push studs 34, and at the same time the transfer plunger itself ejects the pot cull. The ejection movement of the transfer plunger is arrested by suitably adjusted stops 36, and the plunger is no longer urged upwardly when a little later cam 52 passes ejection switch 50. When the mold has fully opened, the movable platen 14 bears against a "Mold Open" switch 56, which initiates downward movement of the transfer plunger to initial position. When the transfer plunger has moved all the way down, it engages a "Transfer Off" switch 60, which discontinues the application of power to the transfer cylinder, leaving both ends connected to waste.

The ejection switch 50 mentioned in connection with Fig. 2 is shown in greater detail in Fig. 3, in which it will be seen that the switch 50 is a micro-switch having an operating plunger 70 which responds to the raised cam surface 52 on cam bar 54.

The valve arrangement for the press is schematically illustrated in Fig. 4 of the drawings, referring to which it will be seen that the pipes 38 and 40 leading to the clamp cylinder of the press are connected to a four-way hydraulic valve 72. A suitable fluid under pressure, usually water, is supplied through a pipe 74. There is also a waste pipe 76. The four-way valve is actuated by compressed air supplied through an air pipe 78, and operating on a diaphragm located at 80. The return movement is by means of compression springs 82.

For economy in the use of high pressure water, the main movement of the clamp piston is preferably produced by relatively low pressure water supplied through pipe 74, the available pressure being a matter of say 700 pounds per square inch (although an even lower pressure is adequate to move the die). During the molding operation itself, the die is preferably kept closed under a high pressure of the order of say 2800 pounds per square inch. High pressure water is supplied through a pipe 84, and a so-called "automatic high" valve 86, and thence to pipe 38. During closing of the die, the back pressure on the automatic high valve may be a matter of only 150 pounds per square inch, and the valve remains closed. When the mold closes, the back pressure on the automatic high valve 86 builds up to say 700 pounds per square inch, whereupon the valve opens, admitting high pressure water to the clamp cylinder. Loss of this high pressure water into the low pressure line 74 is prevented by a suitable check valve 88.

It will be observed that the high pressure line is connected to pipe 38 leading to the upper end of the clamp cylinder, but not to the pipe 40 leading to the lower end of the clamp cylinder. The reason for this is that the low pressure water is adequate to raise or open the die, and therefore there is no need to supply high pressure water through an automatic high valve. However, it is evident that if that were desired it would be necessary merely to make a connection to pipe 74 similar to that shown here to pipe 38, instead of the latter.

The desired control of the transfer cylinder through pipes 42 and 44 is somewhat more involved, and it is not feasible to employ a single four-way valve such as the valve 72. The reason for this is that the four-way valve would provide for only two conditions, the transfer plunger moving either upward all the way to the top limit, or downward all the way to the bottom limit. Now the transfer plunger preferably should not be moved downward before the mold is open, for the resulting suction between the upper end of the plunger and the lower end of the pot cull will tend to draw the cull downwardly with the plunger, breaking it away from the gate and the molded pieces. If, on the other hand, pressure is maintained on the transfer plunger while the mold is opened, the plunger will press upwardly and hold the pot cull against the upper half of the die. There would be a tendency to break the pot cull from the gate, or in the alternative, to prematurely eject the gate from the lower die or ejector die. It will not do to simply mechanically limit the amount of additional upward movement of the plunger to a very small amount, on the one hand, for that would not be adequate for a relatively deep molded piece, and on the other hand, the provision of a large permitted movement would require a still greater movement of the cover die, which would be wasteful of time and hydraulic power. Moreover, with the piece first ejected from the lower die, it will tend to adhere to the upper die. The upper die might be made the ejector die, but that is itself a disadvantage.

Instead, the transfer plunger is preferably kept stationary while the mold is opened, and the transfer plunger is thereafter moved upwardly as a part of the ejection operation. To accomplish this the pipes 42 and 44 leading to the ends of the transfer cylinder are preferably each provided with individual three-way valves 92 and 94 respectively. These have connections 96 and 98 for pressure water, and waste connections 100 and 102. The valves are preferably air-operated valves, having diaphragms at 104 and 106, with air pipes 108 and 110. The low pressure water is supplied at 112, and manually operable valves 114 and 116 may be inserted between the supply pipe 112 and the valves for the two cylinders.

If it be desired to use the high pressure water for the transfer operation, as is usually the case, it is merely necessary to use an automatic high valve 118, connected to the lower pipe 44 of the transfer cylinder, and a suitable check valve 120 to prevent backing of the high pressure water into the low pressure line. The pipe 119 is connected to the high pressure source.

The valves referred to in the above description are made by and may be purchased from Seely Instrument Company, Inc., of Niagara Falls, New York, and Sinclair Collins Company of Akron, Ohio, and others.

A wiring diagram for the electrical part of the apparatus is shown in Fig. 5 of the drawings. The air pipes 78, 108, and 110 correspond to the similarly numbered air pipes shown in Fig. 4. The supply of air is controlled by solenoid-operated three-way air valves 122, 124, and 126 respectively. While not shown on the wiring diagram, it will be understood that each of these air valves has two additional pipe connections, one to a source of compressed air, and the other to waste or open air, so that the pipes 78, 108, and 110 may be connected to either the compressed air supply, or to the open air or waste line. The timing clock previously mentioned is shown at 130. The left-hand and right-hand starting buttons referred to in connection with Fig. 1 of the drawings, are shown at 46 and 48. The press switch or knock-out switch mentioned in connection with Figs. 2 and 3 is shown at 50. These switches correspond to the similarly numbered switches in Figs. 1 and 2. The "Mold Open" switch is shown at 56. The "Mold Closed" switch is shown at 58. The "Transfer Off" switch is shown at 60. The clamp switches 62 and 64 correspond to the similarly numbered parts in Fig. 1.

Power is supplied at lines 1 and 2, the switching being done in line 2, while line 1 acts as a common return which may, if desired, be grounded.

The operation is next described, assuming that the press is in open or repose condition; that it has already been warmed up; and that a pill has been placed in the transfer pot. Current enters at line 2, and flows through wire 132, and cut-off switch 134, to separable, normally closed contacts 136 which are operated by the clock 130. Current then flows through wire 138, to normally closed push button switches 140 and 142, arranged in series. These are simply stop buttons, and left-hand and right-hand buttons are provided for the convenience of the operator, so that one or the other will be within easy reach at either side of the press. Current then flows through wire 144, to left and right-hand start buttons 46 and 48, which at this time must be assumed closed, it being necessary for the operator to simultaneously press both starting buttons to start the press. This, of course, is a safety measure, to ensure that both hands of the operator have been taken out of the mold before starting the press.

Current then flows through wire 146, to the coil of relay 148, and thence through wires 150 and 152, to line 1. This causes the relay to close, changing the center contact 154 from the upper position shown, to its lower position, and thereby causing current to flow from wire 144, through wire 156, to contact 154, and thence through the bottom contact, to the relay coil 148, and thence through wires 150 and 152, to line 1 as previously described. This causes the relay to act as a stick relay, which remains closed even though the start buttons 46 and 48 may have been pushed only momentarily.

The current available at wire 144 also flows either through the start buttons, or through the relay and wire 146, to wire 158, and thence to the "Mold Closed" switch 58, the function of which will be described later.

The current available at relay 148 also flows through wire 160, to a push button-type "clamp switch" 62, which is normally closed to the right, hence the current proceeds to the wire 162. The switches 62 and 64 are both push button switches, which are normally closed from the center wire to the right-hand wire. Upward push on the buttons opens the right-hand circuit, and closes the circuit from the center wire to the left-hand wire.

Current flowing in wire 162 runs to the magnet of the three-way air valve 122, and returns by way of wire 164 to line 1, thus completing the circuit, and energizing the air valve, so as to supply compressed air to the four-way hydraulic valve (72 in Fig. 4) of the clamp cylinder. This causes descent of the movable head of the press, thus clamping the mold closed. The further application of high pressure water as soon as the mold is closed is taken care of by the automatic high valve, as previously described. When the mold has moved down to its closed position, it strikes the "Mold Closed" switch, shown at 58 in Figs. 2 and 5.

Closing of the "Mold Closed" switch 58 (Fig. 5) causes current to flow from wire 158, to wire 166, and wire 168, to the magnet of solenoid-operated air valve 126. This operates the valve 126, and applies compressed air to the lower three-way hydraulic valve (94 in Fig. 4), thereby causing the transfer plunger to move upward. The circuit of valve 126 is completed by wires 182 and 184 returning to line 1.

At the same time current flows from wire 166 to wire 170, wire 171, wire 172, normally closed switch 174, and wire 176, to the motor of time clock 130, thus starting the timing operation. The circuit is completed by wire 152 returning to line 1.

The parts remain in this condition throughout the curing time, and until the time clock 130 runs out. This clock, of course, is adjustable over a wide range to accommodate the necessary curing time for different molded pieces. When the time clock runs out, the contacts 136 open, thus interrupting the connection to line 2, and so de-energizing the relay 148, whereupon the contact 154 returns to its normal upward position shown in the drawings. This interrupts the current supply circuit through wires 146, 158, "Mold Closed" switch 58, wire 166, and wire 168, to the "Transfer Up" valve 126. Thus pressure is removed from the lower end of the transfer cylinder, leaving both ends connected to waste, so that there is no tendency for the transfer plunger to move either up or down. At the same time the supply of current through wires 160 and 162 to the air valve 122 for the clamp cylinder is interrupted, causing the four-way hydraulic valve (72 in Fig. 4) to reverse its position, thus admitting water to the lower end of the clamp cylinder, and causing the mold to open.

Reverting to Fig. 2, as the press platen 14 rises, it carries cam bar 54 with it, and the cam 52 operates on switch 50, which may be called a "knock-out" or "ejection" switch. In the position shown in Fig. 2 the mold is fully opened. However, when the mold is fully closed, the cam 52 is located below the switch 50. As the mold opens, and when it is only partially open, the cam 52 depresses the switch plunger.

Reverting now to Fig. 5, it should be explained that the clock contacts 136 are normally closed when the clock is reset, which happens as soon as the time clock runs out. In other words, when the curing time runs out, the contacts 136 need be opened only momentarily, for that releases the relay 148, following which the circuits previously described to the air valves 122 and 126 remain dead. Now when ejection switch 50 is closed, current flows from line 2, through wire 132, switch 134, clock contacts 136, wire 138, and stop buttons 140 and 142, to wire 144. It continues through wire 156, to the center contact 154 of the relay, to the top contact, through wire 178, to knock-out switch 50, and thence through wire 180 to wire 170, and wire 168, to the "Transfer Up" valve 126. The circuit is completed through wire 182, and wire 184, to line 1. This again applies compressed air to the diaphragm of the lower three-way hydraulic valve (94 in Fig. 4), which admits water to the lower end of the transfer cylinder, and so causes continued upward movement of the transfer platen (32 in Figs. 1 and 2), with consequent ejection of the cull and the molded pieces. When the transfer platen comes to its top position, it is arrested by stops 36, but only after having acted on the ejector plate through the push studs 34.

This, of course, takes place after the movable head or platen 14 of the press has opened the mold somewhat, but in order to save time, the delay is minimized, and is not nearly as great as it would be if the movable head 14 were first brought to topmost position. Instead, the movable head 14 continues rising until finally the cam 52 passes the knock-out switch 50 entirely, whereupon the said switch again opens.

This opening of switch 50 de-energizes the "Transfer Up" valve 126. Thus the lower end of the transfer cylinder is again connected to waste, and the transfer plunger remains at rest in uppermost or ejection position. When the movable head 14 has risen to uppermost position, it reaches and closes the "Mold Open" switch 56 (see Fig. 2). In Fig. 5 it will be seen that current may now be traced from wire 144 at the start and stop buttons through wire 186, to the lower right-hand contact of a switch 188. This is a double-pole, double-throw switch, which is thrown upwardly for automatic operation, and downwardly for manual operation. It is normally in the upward position, and is now assumed to be in that position. Current flows from the lower right terminal, through a connection on the back of the switch, to the left center terminal, and thence through the switch, to the upper left terminal, and thence through wire 190 to the "Mold Open" switch 56.

This is now closed, because the mold is fully open, hence current proceeds through wire 192, to the upper right-hand terminal of switch 188, thence through the switch, to the right center terminal, and then through wire 194, to the center terminal of push button transfer switch 64. This is normally closed to the right, and therefore current flows through wire 196, to the "Transfer Off" switch 60. In Fig. 2 it will be seen that the "Transfer Off" switch 60 is mounted on a support strip or panel strip 68, and is so positioned as to be engaged when the transfer platen 32 has moved down to lowermost position.

Reverting to Fig. 5, it must be kept in mind that at this time the transfer platen is in uppermost position, rather than lowermost position, and switch 60 is normally closed. Current therefore flows through switch 60, to wire 198, and thence to the "Transfer Down" air valve 124. This supplies compressed air to the upper three-way hydraulic valve (92 in Fig. 4), which supplies water to the upper end of the transfer cylinder, and so causes the transfer platen to go down to its lowermost position. The circuit from valve 124 (Fig. 5) is completed by wire 200, wire 182, and wire 184, to line 1.

When the transfer platen reaches its lowermost position, it contacts the "Transfer Off" switch 60, and opens the switch, thus opening the circuit to the air valve 124, and so connecting the upper end of the transfer cylinder to waste.

The foregoing completes the normal cycle of operation of the press, and it will be recalled that the mold was closed, material was transferred from the pot into the mold, the material was cured for a desired time, the mold was then partially opened, the molded piece was ejected, the mold was fully opened, and the transfer plunger was restored to lowermost or rest position.

In setting up a new mold in the press, it is desirable to be able to manually control the press for small increments of movement. For this purpose the double-pole, double-throw switch 188 may be changed from its upper or automatic position, to its lower or manual position. When that is done, the clamp switch button 62 may be used to bring the movable head of the press downward, and the moment the button 62 is released, the head moves back upward. The manner in which this is accomplished will be seen in Fig. 5, in which current at 144 near the start and stop buttons flows through wire 186, to the lower right terminal of switch 188, to the center left terminal, and downward through the switch to the lower left terminal, and then through wire 202, to the push button switch 62, which, being pressed, opens the connection to the right-hand terminal and instead closes it to the left-hand terminal. Current therefore continues through wire 162, to the air valve 122 for the clamp cylinder, the circuit being completed by wires 164 and 184 to line 1. Thus, as long as the push button 62 is pressed, the clamp cylinder urges the movable head downwardly, and when push button 62 is released, the air valve 122 returns to normal position and the clamp cylinder moves the head upwardly.

Referring to Fig. 4, attention is directed to the valve 114, which may be nearly closed, in order to greatly restrict the speed at which the clamp cylinder will bring the mold down. This may be used even when molding, but is particularly valuable when setting up a mold, for by keeping one hand on valve 114, it may be intermittently closed and cracked open to move the upper mold downwardly increment by increment, and by leaving valve 114 closed, the mold will be held in whatever position it was in when the valve was closed. This is so even if push button 62 is released, for with valve 114 closed there is no supply of pressure water to raise the mold. By cracking the valve 114 intermittently while pressing push button 62, the upper half of the mold may be moved incrementally in closing direction, and similarly, by cracking the valve 114 intermittently, without pressing the push button 62, the upper half of the mold may be moved incrementally in opening direction.

In somewhat similar fashion, the transfer push button 64 may be used to control the operation of the transfer cylinder and plunger. Specifically, current on wire 144 near the start and stop buttons flows through wire 186, to the lower right-hand terminal of switch 188, thence through the switch, to the center right-hand terminal, and thence through wire 194, to the center of push button switch 64. When the button is pressed, the circuit to the right is opened, and closed to the left, so that current flows through wire 204, wire 171, wire 170, and wire 168, to the "Transfer Up" valve 126, thus causing the transfer plunger to rise. The circuit is completed from valve 126, through wire 182, and wire 184, to line 1.

The transfer plunger is urged upward as long as the transfer push button 64 is pressed. The speed at which it rises may be controlled by manual operation of valve 116 (Fig. 4). This may be used to control the speed of operation of the transfer plunger even during molding. It may be intermittently closed and cracked open for precise control of the transfer plunger when setting up a new mold installation. By intermittently cracking the valve 116, without pressing the transfer push button 64, the plunger will be incrementally moved downward, and by intermittently cracking the valve 116 while pressing the transfer push button 64, the plunger will be incrementally moved upward.

Another contingency provided for is warming up the mold and transfer plunger. The preferred practice is to warm the mold with the mold closed for a number of hours, say four hours, before beginning to mold. The transfer plunger usually has no heating means of its own, and is heated by inserting it in the mold during the warming up period. Once warmed up, the press is preferably operated three shifts a day, until it is shut down for the week-end. During lunch hour, the press is kept closed, with the transfer plunger raised, in order to keep the mold and plunger warm.

In Fig. 5 attention is directed to the switch 174. This is normally closed, but when opened it cuts off the supply of current to the motor of the time clock 130. With the motor of the time clock cut out, it is merely necessary to press the start buttons 46 and 48, thereby causing closing of the mold, and lifting of the transfer plunger. The press then remains closed, because the clock is not set into operation, and never terminates the molding cycle. It goes without saying that this is never done with molding material in the press. It is done only with an empty press.

The timer cut-off switch 174 may also be used when a single operator controls two presses, for in such case some operators prefer to cut out the timer from the second press. The first press is loaded and started, thus beginning the cycle. The operator then goes to the second press, and loads, and starts that press. When the first press runs out, he removes the molded piece from the press, re-loads, and closes the press, and thereupon immediately proceeds to the second press, and presses either the right-hand or the left-hand stop button 140 or 142 to open the second press, whereupon he unloads and re-loads the second press. Thus the timer of the first press is used as a guide for operation of the second press. This method assumes that the unloading and reloading time is substantially the same for both presses.

Attention is also directed to normally closed switch 134, which is in series with the clock contacts 136, and the stop buttons 140 and 142. The opening of any of these switches will de-energize relay coil 148, and so terminate the molding cycle. Momentary depression of either stop button is equivalent to running out of the timer. Switch 134 differs primarily in that it will remain in either closed or open position, hence when thrown to open position, the press cannot be closed, and remains safe.

The essential purpose of the push button switches 62 and 64 is to facilitate setting up or installing a mold in the press. Thereafter there is ordinarily no occasion to use the buttons 62 and 64.

The switches 50, 56, 58 and 60 shown at the right-hand portion of the wiring diagram are those which are mounted on the press, and which are automatically controlled by movement of the press. Of these the ejection switch 50 is controlled by the vertical cam, and indicates several stages in the opening of the mold. The "Mold Open" switch 56 indicates when the movable head has moved upward to top position, so that the mold is fully open. The "Mold Closed" switch 58 is also controlled by the movable head of the press, and indicates when the mold has been closed. The switch 60 is controlled by the transfer platen, and indicates when the transfer plunger is down to lowermost position.

In Fig. 5 a time totalizer is shown at 210, and a counter at 212. The time totalizer may be a simple non-re-setting clock, which operates register wheels reading directly in time. This totalizes the entire time during which the press is molding pieces, a factor which is taken into consideration when determining cost figures. Thus while the timing clock 130 re-sets at each operation of the press, the totalizer 210 continues to integrate the periods of time during which the transfer plunger is raised, and thus totals the curing time. The counter 212 is connected in shunt across the totalizer 210, and counts the number of cycles or press operations, which in turn, if multiplied by the number of die cavities, will count the total number of pieces molded.

It is believed that the construction and operation of my improved automatic control for transfer molding presses, as well as the advantages thereof, will be apparent from the foregoing detailed description. For safety, two spaced buttons must be pressed simultaneously to start the press. The mold is closed, following which the transfer plunger is operated, and the curing time begins. At the expiration of the predetermined time, the transfer cylinder is put in equilibrium. Specifically, both ends of the transfer cylinder are connected to waste, so that the plunger will remain stationary, while the clamp cylinder begins to open the mold. After partial opening of the mold, the transfer plunger is operated further to help eject the parts from the mold. Meanwhile, the clamp cylinder continues to open the mold until it is fully opened, whereupon the transfer cylinder is operated to lower the transfer plunger to bottom position. With the plunger in lowermost position both ends of the transfer cylinder are again connected to waste, so that the plunger remains in that position until the operator takes care of the press by unloading it, re-loading it, and again pressing the starting buttons. These operations are all accomplished without the use of a program cycle shaft. Instead, the only thing required are inexpensive limit switches, and a single time clock which measures the length of the curing cycle.

The inverted press is of advantage, because the molding material may be loaded downwardly into a transfer pot at convenient height. The pot is open at the top and closed at the bottom, even with the mold open. The stroke needed for the transfer plunger is small, compared to that needed when the plunger and loading station are above the mold. Any flash formed around the plunger tends to drop gravitationally in a downward direction away from the mold, instead of tending to fall into the mold, with consequent danger of spoiling the molded piece. With the present arrangement there is no danger of suction by the plunger on the cull pulling the cull away from the molded piece while the mold is closed.

It is a simple matter to keep the press closed in order to heat the same. The parts of the press may be controlled manually, and in small increments, to take care of setting up a new mold in the press.

It will be apparent that while I have shown and described the improved press of my invention in a preferred form, changes may be made in the structure and circuit shown, without departing from the spirit of the invention, as sought to be defined in the following claims.

I claim:

1. Automatic control mechanism for putting an inverted transfer molding press through a program cycle of operation, said press having a clamp cylinder at the top for opening and closing a mold by moving the upper part of the mold, a transfer cylinder at the bottom, a transfer pot in the lower stationary part of the mold, a transfer plunger for transferring molding material upward from the pot, ejection means in the lower stationary part of the mold for ejecting the molded product upwardly, said ejection means as well as said transfer plunger being operated by the transfer cylinder, said control mechanism including a valve for the clamp cylinder, independent valves for the transfer cylinder such that the transfer plunger may be moved upwardly, or downwardly, or left floating in equilibrium, a timing clock, means to start closing of the press, means responsive to closing of the press to start the transfer operation and the timing clock, means responsive to running out of the timing clock to start opening of the press and to put the transfer cylinder in equilibrium, means responsive to partial opening of the press to cause resumed upward transfer movement for purposes of upward ejection of the finished molded product, and means responsive to complete opening of the press to move the transfer plunger downward to lowermost position.

2. Automatic control mechanism for putting an inverted transfer molding press through a program cycle of operation, said press having a clamp cylinder at the top, a transfer cylinder at the bottom, and a transfer pot in the lower half of the mold, and said control mechanism being devoid of a conventional program cycle shaft or timing shaft with cams thereon, said control mechanism including a valve for the clamp cylinder, a valve for the transfer cylinder, a timing clock, means to start closing of the press, means responsive to closing of the press to start the transfer operation and the timing clock, means responsive to running out of the timing clock to put the transfer cylinder in equilibrium and to start opening of the press, means responsive to partial opening of the press to cause a resumption of the transfer movement for purposes of ejection, and means responsive to complete opening of the press to reverse the power to the transfer cylinder in order to restore the transfer plunger to lowermost position.

3. Automatic control mechanism for putting an inverted transfer molding press through a program cycle of operation, said press having a clamp cylinder at the top, a transfer cylinder at the bottom, and a transfer pot in the lower half of the mold, said control mechanism including a four-way valve for the clamp cylinder, a source of low pressure fluid connected to said valve through a check valve, an automatic high pressure valve connected to the upper end of said clamp cylinder, a three-way valve connected to the upper end of the transfer cylinder, a three-way valve connected to the lower end of the transfer cylinder, the aforesaid source of low pressure fluid being connected to the aforesaid three-way valves, an automatic high pressure valve connected to the lower end of the transfer cylinder, a timing clock, and mechanism for controlling the aforesaid valves including means responsive to closing of the press to initiate the transfer operation, means responsive to running out of the timing clock to initiate opening of the press, and means responsive to opening of the press to cause restoration of the transfer plunger to lowermost position.

4. Automatic control mechanism for putting an inverted transfer molding press through a program cycle of operation, said press having a clamp cylinder at the top, a transfer cylinder at the bottom, and a transfer pot in the lower half of the mold, said control mechanism including a four-way valve for the clamp cylinder, a source of low pressure fluid connected to said valve through a check valve, an automatic high pressure valve connected to the upper end of said clamp cylinder, a three-way valve connected to the upper end of the transfer cylinder, a three-way valve connected to the lower end of the transfer cylinder, the aforesaid source of low pressure fluid being connected to the aforesaid three-way valves, an automatic high pressure valve connected to the lower end of the transfer cylinder, a timing clock, and mechanism for controlling the aforesaid valves including means responsive to closing of the press to initiate the transfer operation, means responsive to running out of the timing clock to initiate opening of the press, means responsive to partial opening of the press to cause ejection, and means responsive to complete opening of the press to cause restoration of the transfer plunger to lowermost position.

5. Automatic control mechanism for putting an inverted transfer molding press through a program cycle of operation, said press having a clamp cylinder at the top, a transfer cylinder at the bottom, and a transfer pot in the lower half of the mold, and said control mechanism being devoid of a conventional program cycle shaft or timing shaft with cams thereon, said control mechanism including a four-way valve for the clamp cylinder, a source of low pressure fluid connected to said valve through a check valve, an automatic high valve pressure connected to the upper end of said clamp cylinder, a three-way valve connected to the upper end of the transfer cylinder, a three-way valve connected to the lower end of the transfer cylinder, the aforesaid source of low pressure fluid being connected to the aforesaid three-way valves, an automatic high valve pressure connected to the lower end of the transfer cylinder, a timing clock, and mechanism for controlling the aforesaid valves including means responsive to closing of the press to initiate the transfer operation, means responsive to running out of the timing clock to initiate opening of the press and to arrest movement of the transfer plunger, means responsive to partial opening of the press to cause resumption of movement of the transfer plunger for ejection, and means responsive to complete opening of the press to cause restoration of the transfer plunger to lowermost position.

6. Automatic control mechanism for putting an inverted transfer molding press through a program cycle of operation, said press having a clamp cylinder at the top, a transfer cylinder at the bottom, and a transfer pot in the lower half of the mold, said control mechanism including an air-operated four-way hydraulic valve for the clamp cylinder, a source of low pressure fluid connected to said valve through a check valve, an automatic high pressure valve connected to the upper end of said clamp cylinder, an air-operated three-way hydraulic valve connected to the upper end of the transfer cylinder, an air-operated three-way hydraulic valve connected to the lower end of the transfer cylinder, the aforesaid source of low pressure fluid being connected to the aforesaid three-way valves, an automatic high pressure valve connected to the lower end of the transfer cylinder, solenoid-operated air valves for controlling the supply of air to the aforesaid hydraulic valves, and appropriate circuits including a timing clock and switches on the press for controlling the aforesaid air valves including means responsive to closing the press to initiate the transfer operation, means responsive to running out of the timing clock to initiate opening of the press, and means responsive to opening of the press to cause restoration of the transfer plunger to lowermost position.

7. Automatic control mechanism for putting an inverted transfer molding press through a program cycle of operation, said press having a clamp cylinder at the top, a transfer cylinder at the bottom, and a transfer pot in the lower half of the mold, said control mechanism including an air-operated four-way hydraulic valve for the clamp cylinder, a source of low pressure fluid connected to said valve through a check valve, an automatic high pressure valve connected to the upper end of said clamp cylinder, an air-operated three-way hydraulic valve connected to the upper end of the transfer cylinder, an air-operated three-way hydraulic valve connected to the lower end of the transfer cylinder, the aforesaid source of low pressure fluid being connected to the aforesaid three-way valves, an automatic high pressure valve connected to the lower end of the transfer cylinder, solenoid-operated air valves for controlling the supply of air to the aforesaid hydraulic valves, and appropriate circuits including a timing clock and switches on the press for controlling the aforesaid air valves including means responsive to closing of the press to initiate the transfer operation, means responsive to running out of the timing clock to initiate opening of the press, means responsive to partial opening of the press to cause ejection, and means responsive to complete opening of the press to cause restoration of the transfer plunger to lowermost position.

8. Automatic control mechanism for putting an inverted transfer molding press through a program cycle of operation, said press having a clamp cylinder at the top, a transfer cylinder at the bottom, and a transfer pot in the lower half of the mold, and said control mechanism being devoid of a conventional program cycle shaft or timing shaft with cams thereon, said control mechanism including an air-operated four-way hydraulic valve for the clamp cylinder, a source of low pressure fluid connected to said valve through a check valve, an automatic high pressure valve connected to the upper end of said clamp cylinder, an air-operated three-way hydraulic valve connected to the lower end of the transfer cylinder, the aforesaid source of low-pressure fluid being connected to the aforesaid three-way valves, an automatic high pressure valve connected to the lower end of the transfer cylinder, solenoid-operated air valves for controlling the supply of air to the aforesaid hydraulic valves, and appropriate circuits including a timing clock and switches on the press for controlling the aforesaid air valves including means responsive to closing of the press to initiate the transfer operation, means responsive to running out of the timing clock to initiate opening of the press and arrest movement of the transfer plunger, means responsive to partial opening of the press to cause resumption of movement of the transfer plunger for ejection, and means responsive to complete opening of the press to cause restoration of the transfer plunger to lowermost position.

9. Automatic control mechanism for putting an inverted transfer molding press through a program cycle of operation, said press having a clamp cylinder at the top, a transfer cylinder at the bottom, and a transfer pot in the lower half of the mold, said control mechanism including valve mechanism for the clamp cylinder, valve mechanism for the transfer cylinder, electrical means to control said valve mechanisms, a timing clock controlling contacts, a stick relay in said contact circuit, a mold-closed switch on said press responsive to closing of the mold, a mold-open switch on said press responsive to full opening of the mold, a starting switch, and wiring so interconnecting the clock, the relay, the switches, and the valves, that momentary operation of the starting switch closes the stick relay and initiates closing of the press, closing of the press operates the press-closed switch and initiates the transfer operation and starting of the timing clock, running out of the timing clock initiates opening of the press, and complete opening of the press operates the press-open switch and causes return movement of the transfer plunger to lowermost position.

10. Automatic control mechanism for putting an inverted transfer molding press through a program cycle of operation, said press having a clamp cylinder at the top, a transfer cylinder at the bottom, and a transfer pot in the lower half of the mold, said control mechanism including valve mechanism for the clamp cylinder, valve mechanism for the transfer cylinder, electrical means to control said valve mechanisms, a timing clock controlling contacts, a stick relay in said contact circuit, a mold-closed switch on said press responsive to closing of the mold, a mold-open switch on said press responsive to full opening of the mold, and a transfer-off switch on said press responsive to movement of the transfer plunger to lowermost position, a starting switch, and wiring so interconnecting the clock, the relay, the switches, and the valves, that momentary operation of the starting switch closes the stick relay and initiates closing of the press, closing of the press operates the press-closed switch and initiates the transfer operation and starting of the timing clock, running out of the timing clock initiates opening of the press, and complete opening of the press operates the press-open switch and causes return movement of the transfer plunger to lowermost position, whereupon the transfer-off switch takes power off the transfer cylinder.

11. Automatic control mechanism for putting an inverted transfer molding press through a program cycle of operation, said press having a clamp cylinder at the top, a transfer cylinder at the bottom, and a transfer pot in the lower half of the mold, said control mechanism including valve mechanism for the clamp cylinder, valve mechanism for the transfer cylinder, electrical means to control said valve mechanisms, a timing clock controlling contacts, a stick relay in said contact circuit, a mold-closed switch on said press responsive to closing of the mold, an ejection switch on said press responsive to partial opening of said mold, and a mold-open switch on said press responsive to full opening of the mold, a starting switch, and wiring so interconnecting the clock, the relay, the switches, and the valves, that momentary operation of the starting switch closes the stick relay and initiates closing of the press, closing of the press operates the press-closed switch and initiates the transfer operation and starting of the timing clock, running out of the timing clock initiates opening of the press and arrests movement of the transfer plunger by connecting both ends of the transfer cylinder to waste, partial opening of the press operates the ejection switch and causes resumption of movement of the transfer plunger for ejection, and complete opening of the press operates the press-open switch and causes return movement of the transfer plunger to lowermost position.

12. Automatic control mechanism for putting an inverted transfer molding press through a program cycle of operation, said press having a clamp cylinder at the top, a transfer cylinder at the bottom, and a transfer pot in the lower half of the mold, said control mechanism including valve mechanism for the clamp cylinder, valve mechanism for the transfer cylinder, electrical means to control said valve mechanisms, a timing clock controlling contacts, a stick relay in said contact circuit, a mold-closed switch on said press responsive to closing of the mold, an ejection switch on said press responsive to partial opening of said mold, a mold-open switch on said press responsive to full opening of the mold, and a transfer-off switch on said press responsive to movement of the transfer plunger to lowermost position, a starting switch, and wiring so interconnecting the clock, the relay, the switches, and the valves, that momentary operation of the starting switch closes the stick relay and initiates closing of the press, closing of the press operates the press-closed switch and initiates the transfer operation and starting of the timing clock, running out of the timing clock initiates opening of the press and arrests movement of the transfer plunger by connecting both ends of the transfer cylinder to waste, partial opening of the press operates the ejection switch and causes resumption of movement of the transfer plunger for ejection, and complete opening of the press operates the press-open switch and causes return movement of the transfer plunger to lowermost position, whereupon the transfer-off switch takes power off the transfer cylinder.

13. Automatic control mechanism for putting an inverted transfer molding press through a program cycle of operation, said press having a clamp cylinder at the top, a transfer cylinder at the bottom, and a transfer pot in the lower half of the mold, said control mechanism including a four-way hydraulic valve for the clamp cylinder, a source of low pressure fluid connected to said valve through a check pressure valve, an automatic high valve connected to the upper end of said clamp cylinder, a three-way hydraulic valve connected to the upper end of the transfer cylinder, a three-way hydraulic valve connected to the lower end of the transfer cylinder, the aforesaid source of low pressure fluid being connected to the aforesaid three-way valves, an automatic high pressure valve connected to the lower end of the transfer cylinder, electrical means to control said valves, a timing clock controlling contacts, a stick relay in said contact circuit, a mold-closed switch on said press responsive to closing of the mold, and a mold-open switch on said press responsive to full opening of the mold, a starting switch, and wiring so interconnecting the clock, the relay, the switches, and the valves that momentary operation of the starting switch operates the stick relay and initiates closing of the press, closing of the press operates the press-closed switch and initiates the transfer operation and starting of the timing clock, running out of the timing clock initiates opening of the press, and complete opening of the press operates the press-open switch and causes return movement of the transfer plunger to lowermost position.

14. Automatic control mechanism for putting an inverted transfer molding press through a program cycle of operation, said press having a clamp cylinder at the top, a transfer cylinder at the bottom, and a transfer pot in the lower half of the mold, and said control mechanism being devoid of a conventional program cycle shaft or timing shaft with cams thereon, said control mechanism including an air operated four-way hydraulic valve for the clamp cylinder, a source of low pressure fluid connected to said valve through a check valve, an automatic high pressure valve connected to the upper end of said clamp cylinder, an air-operated three-way hydraulic valve connected to the upper end of the transfer cylinder, an air-operated three-way hydraulic valve connected to the lower end of the transfer cylinder, the aforesaid source of low pressure fluid being connected to the aforesaid three-way valves, an automatic high pressure valve connected to the lower end of the transfer cylinder, solenoid-operated air valves for controlling the supply of air to the aforesaid hydraulic valves, a timing clock controlling contacts, a stick relay in said contact circuit, a mold-closed switch on said press responsive to closing of the mold, and a mold-open switch on said press responsive to full opening of the mold, a starting switch, and wiring so interconnecting the clock, the relay, the switches, and the solenoid-operated air valves that momentary operation of the starting switch operates the stick relay and initiates closing of the press, closing of the press operates the press-closed switch and initiates the transfer operation and starting of the timing clock, running out of the timing clock initiates opening of the press, and complete opening of the press operates the press-open switch and causes return movement of the transfer plunger to lowermost position.

15. Automatic control mechanism for putting an inverted transfer molding press through a program cycle of operation, said press having a clamp cylinder at the top, a transfer cylinder at the bottom, and a transfer pot in the lower half of the mold, said control mechanism including a four-way hydraulic valve for the clamp cylinder, a source of low pressure fluid connected to said valve through a check valve, an automatic high pressure valve connected to the upper end of said clamp cylinder, a three-way hydraulic valve connected to the upper end of the transfer cylinder, a three-way hydraulic valve connected to the lower end of the transfer cylinder, the aforesaid source of low pressure fluid being connected to the aforesaid three-way valves, an automatic high pressure valve connected to the lower end of the transfer cylinder, electrical means to control said valves, a timing clock controlling contacts, a stick relay in said contact circuit, a mold-closed switch on said press responsive to closing of the mold, an injection switch on said press responsive to partial opening of said mold, a mold-open switch on said press responsive to full opening of the mold, and a transfer-off switch on said press responsive to movement of the transfer plunger to lowermost position, a starting switch, and wiring so interconnecting the clock, the relay, the switches, and the valves that momentary operation of the starting switch operates the stick relay and initiates closing of the press, closing of the press operates the press-closed switch and initiates the transfer operation and starting of the timing clock, running out of the timing clock initiates opening of the press and arrests movement of the transfer plunger by connecting both ends of the transfer cylinder to waste, partial opening of the press operates the ejection switch and causes resumption of movement of the transfer plunger for ejection, and complete opening of the press operates the press-open switch and causes return movement of the transfer plunger to lowermost position, whereupon the transfer-off switch takes power off the transfer cylinder.

16. Automatic control mechanism for putting an inverted transfer molding press through a program cycle of operation, said press having a clamp cylinder at the top, a transfer cylinder at the bottom, and a transfer pot in the lower half of the mold, and said control mechanism being devoid of a conventional program cycle shaft or timing shaft with cams thereon, said control mechanism including an air-operated four-way hydraulic valve for the clamp cylinder, a source of low pressure fluid connected to said valve through a check valve, an automatic high pressure valve connected to the upper end of said clamp cylinder, an air-operated three-way hydraulic valve connected to the upper end of the transfer cylinder, an air-operated three-way hydraulic valve connected to the lower end of the transfer cylinder, the aforesaid source of low pressure fluid being connected to the aforesaid three-way valves, an automatic high pressure valve connected to the lower end of the transfer cylinder, solenoid-operated air valves for controlling the supply of air to the aforesaid hydraulic valves, a timing clock controlling contacts, a stick relay in said contact circuit, a mold-closed switch on said press responsive to closing of the mold, an injection switch on said press responsive to partial opening of said mold, a mold-open switch on said press responsive to full opening of the mold, and a transfer-off switch on said press responsive to movement of the transfer plunger to lowermost position, a starting switch, and wiring so interconnecting the clock, the relay, the switches, and the solenoid-operated air valves that momentary operation of the starting switch operates the stick relay and initiates closing of the press, closing of the press operates the press-closed switch and initiates the transfer operation and starting of the timing clock, running out of the timing clock initiates opening of the press and arrests movement of the transfer plunger by connecting both ends of the transfer cylinder to waste, partial opening of the press operates the ejection switch and causes resumption of movement of the transfer plunger for ejection, and complete opening of the press operates the press-open switch and causes return movement of the transfer plunger to lowermost position, whereupon the transfer-off switch takes power off the transfer cylinder.

17. Automatic control mechanism for a transfer molding press as defined in claim 9, said mechanism having one or more stop switches in the relay circuit, whereby operation of a stop switch opens the press.

18. Automatic control mechanism for a transfer molding press as defined in claim 11, said mechanism having one or more stop switches in the relay circuit, whereby operation of a stop switch opens the press.

19. Automatic control mechanism for a transfer molding press as defined in claim 1, said mechanism having a switch so arranged in said clock circuit as to make the clock inoperative to open the press, whereby the press may be left closed indefinitely for warming up the same.

20. Automatic control mechanism for a transfer molding press as defined in claim 3, said mechanism having a switch so arranged in said clock circuit as to make the clock inoperative to open the press, whereby the press may be left closed indefinitely for warming up the same.

21. Automatic control mechanism for a transfer molding press as defined in claim 9, said mechanism having a switch so arranged in said clock circuit as to make the clock inoperative to open the press, whereby the press may be left closed indefinitely for warming up the same.

22. Automatic control mechanism for a transfer molding press as defined in claim 13, said mechanism having a switch so arranged in said clock circuit as to make the clock inoperative to open the press, whereby the press may be left closed indefinitely for warming up the same.

GORDON B. SAYRE.

REFERENCES CITED

The following references are of record in the file of this patent:

UNITED STATES PATENTS

| Number | Name | Date |
|---|---|---|
| 2,035,801 | Gastrow | Mar. 31, 1936 |
| 2,145,956 | Stern | Feb. 7, 1939 |
| 2,187,212 | MacMillin | Jan. 16, 1940 |

FOREIGN PATENTS

| Number | Country | Date |
|---|---|---|
| 336,129 | Great Britain | Oct. 9, 1930 |